US010120539B2

(12) United States Patent
Wang

(10) Patent No.: US 10,120,539 B2
(45) Date of Patent: Nov. 6, 2018

(54) METHOD AND DEVICE FOR SETTING USER INTERFACE

(75) Inventor: Qiang Wang, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 734 days.

(21) Appl. No.: 13/882,188

(22) PCT Filed: Feb. 15, 2011

(86) PCT No.: PCT/CN2011/071000
§ 371 (c)(1),
(2), (4) Date: Apr. 28, 2013

(87) PCT Pub. No.: WO2012/055190
PCT Pub. Date: May 3, 2012

(65) Prior Publication Data
US 2013/0212500 A1    Aug. 15, 2013

(30) Foreign Application Priority Data

Oct. 29, 2010 (CN) .......................... 2010 1 0526705

(51) Int. Cl.
G06F 3/0484 (2013.01)
G06F 9/451 (2018.01)
(52) U.S. Cl.
CPC ............ *G06F 3/0484* (2013.01); *G06F 9/451* (2018.02)
(58) Field of Classification Search
CPC ............................ G06F 9/4443; G06F 3/0484
See application file for complete search history.

(56) References Cited

U.S. PATENT DOCUMENTS

| 5,737,553 | A | 4/1998 | Bartok |
| 7,064,772 | B1 | 6/2006 | Thompson et al. |
| 2001/0026277 | A1* | 10/2001 | Dorrell ............... H04N 19/00 345/474 |

(Continued)

FOREIGN PATENT DOCUMENTS

| CN | 1556948 A | 12/2004 |
| CN | 1909705 A | 2/2007 |

(Continued)

OTHER PUBLICATIONS

Title: Glide OS Lunches Kids' Glide Date: Apr. 23, 2009 Publisher: Business Wire.*

(Continued)

*Primary Examiner* — Mandrita Brahmachari
(74) *Attorney, Agent, or Firm* — Oppedahl Patent Law Firm LLC

(57) ABSTRACT

The disclosure provides a method for setting a User Interface (UI). The method comprises the following steps: acquiring and storing image data in a file of a selected background image on a UI management interface; marking space coordinates of a region with different shapes cut on the background image, performing display effect processing on the cut region with different shapes, and outputting a display effect processing result; and recording a preset directory name and a corresponding menu linking path of each icon. The disclosure also discloses a device for setting a UI. By adopting the scheme, a personalized UI can be obtained conveniently and quickly, and user experience is improved.

12 Claims, 4 Drawing Sheets

(56) References Cited

U.S. PATENT DOCUMENTS

| | | |
|---|---|---|
| 2005/0225572 A1 | 10/2005 | Ekpar |
| 2007/0172140 A1* | 7/2007 | Kokemohr ............... G06K 9/40 382/261 |
| 2007/0275736 A1* | 11/2007 | Baek ................. H04M 1/72544 455/457 |
| 2008/0005698 A1 | 1/2008 | Koskinen et al. |
| 2008/0012880 A1* | 1/2008 | Plut .............................. 345/660 |
| 2008/0028326 A1 | 1/2008 | Wilson |
| 2009/0154841 A1* | 6/2009 | Choi ....................... G06T 11/00 382/307 |
| 2009/0303199 A1* | 12/2009 | Cho ................... G06F 3/04883 345/173 |
| 2010/0103186 A1* | 4/2010 | Luengen et al. ............. 345/589 |
| 2010/0194761 A1* | 8/2010 | Rhee ....................... G06T 13/80 345/473 |
| 2011/0016419 A1* | 1/2011 | Grosz et al. ................... 715/769 |
| 2011/0029914 A1* | 2/2011 | Whitby ................... G06T 11/60 715/781 |
| 2011/0084986 A1* | 4/2011 | Kim ............................. 345/660 |
| 2013/0094780 A1* | 4/2013 | Tang ....................... G06T 11/60 382/284 |

FOREIGN PATENT DOCUMENTS

| | | |
|---|---|---|
| CN | 101155239 A | 4/2008 |
| CN | 101192131 A | 6/2008 |
| CN | 101322096 A | 12/2008 |
| CN | 101374213 A | 2/2009 |
| CN | 101872285 A | 10/2010 |
| WO | 2007072195 A1 | 6/2007 |

OTHER PUBLICATIONS

Supplementary European Search Report in European application No. 11835464.6, dated Jul. 3, 2014. (6 pages—see entire document).

International Search Report in international application No. PCT/CN2011/071000, dated Apr. 28, 2011. (4 pages—see entire document).

English Translation of the Written Opinion of the International Search Authority in international application No. PCT/CN2011/071000, dated Apr. 28, 2011. (4 pages—see entire document).

\* cited by examiner

METHOD AND DEVICE FOR SETTING USER INTERFACE

TECHNICAL FIELD

The disclosure relates to a design technology of a User Interface (UI), and in particular to a method and a device for setting a UI.

BACKGROUND

At present, user interfaces of computers, mobile phones or other electronic equipment with screens cannot be customized. In other words, a user can only select a satisfactory interface from the own styles of an operating system, but cannot set a favourite style arbitrarily.

Along with the continuous integration of information technology and communication technology, more and more mobile, portable and compact consumer electronic equipment such as a Tablet Personal Computer (Tablet PC) enters the vision field of people; and no matter professional persons who use the computers frequently, or common consumers who have only used the mobile phones, or even the persons who have never contacted the electronic product hope to finish the own needs in the Tablet PC by convenient and rapid operation. Moreover, more and more consumers begin to pay attention to their own personalized human-machine interface, and they may also adjust the style of the UI of mobile interconnecting equipment according to the change of their own interests and hobbies or the change of moods; and in such a way, an operating method by which a satisfactory and personalized UI of the user can be customized conveniently and rapidly by the user of the mobile interconnecting equipment is required.

However, in the prior art, the method which allows the user to customize the UI does not exist yet, namely, a technical scheme through which the user can customize the satisfactory and personalized UI conveniently and rapidly does not exist at present.

SUMMARY

In view of the above, the main purpose of the disclosure is to provide a method and a device for setting a UI. By the method and the device, a personalized UI can be acquired conveniently and rapidly.

In order to achieve the purpose, the technical scheme of the disclosure is realized in such a way that:

the disclosure provides a method for setting a UI, which includes:

acquiring and storing image data in a file of a selected background image on a UI management interface;

marking space coordinates of a region with different shapes cut on the background image, performing display effect processing on the cut region with different shapes, and outputting a display effect processing result; and recording a preset directory name and a corresponding menu linking path of each icon.

In the scheme above, the acquiring and storing image data in a file of a selected background image on a UI management interface may include: extracting data of a frame, an image layer, an image, a data domain or a control domain from the file of the background image, and storing the data according to a data structure.

In the scheme above, the performing display effect processing on the cut region with different shapes may include: inserting a line shape of a highlighted border of the cut region with different shapes into the file of the selected background image according to the stored image data in the file of the selected background image and the space coordinates of the cut region with different shapes; and/or, acquiring image data of the cut region with different shapes from the stored image data according to space coordinates of a starting point and an end point of each shape; and performing artistic processing on the acquired image data of the region with different shapes and inserting the processed data into the file of the selected background image.

In the scheme above, the method may further include: storing the file of the selected background image before acquiring and storing image data in a file of a selected background image.

In the scheme above, the outputting a display effect processing result may include: storing the output display effect processing result to an assigned position.

In the scheme above, when the file of the selected background image is in a Graphics Interchange Format (GIF), the acquiring and storing image data in a file of a selected background image may include: stripping an imaging block of a data entity in a GIF file from the GIF file according to a meaning of a control block character; and respectively storing data of a stripped static image and a corresponding control character.

In the scheme above, the performing display effect processing on the cut region with different shapes may include: inserting a line shape of a highlighted border of the cut region with different shapes into the GIF file of the selected background image according to the stored data of the static image, the corresponding control character and the space coordinates of the cut region with different shapes; and/or, acquiring data of the cut region with different shapes and the corresponding control character from the stored data of the static image and the corresponding control character according to space coordinates of a starting point and an end point of each shape; and performing artistic processing on the acquired data of the region with different shapes and the corresponding control character, and inserting the processed data into the GIF file of the selected background image.

The disclosure also provides a device for setting a UI, which includes: an acquisition module, a display effect processing module and a recording module, wherein, the acquisition module is configured to acquire and store image data in a file of a selected background image on a UI management interface, and trigger the display effect processing module after storing the image data;

the display effect processing module is configured to mark space coordinates of a region with different shapes cut on the background image after receiving triggering information from the acquisition module, to perform display effect processing on the cut region with different shapes, to output a display effect processing result, and to trigger the recording module after outputting the processing result; and the recoding module is configured to record a preset directory name and a corresponding menu linking path of each icon after receiving triggering information from the display effect processing module.

In the scheme above, the device may further include a storage module which is configured to store the file of the selected background image.

In the scheme above, the acquisition module may specifically be configured to: extract data of a frame, an image layer, an image, a data domain or a control domain from the file of the background image and store the data according to a data structure.

According to the scheme for setting a UI provided by the disclosure, by acquiring and storing the image data in the file of the selected background image on the UI management interface, marking the space coordinates of the region with different shapes cut on the background image, performing the display effect processing on the cut region with different shapes, outputting the display effect processing result, and recording the preset directory name and the corresponding menu linking path of each icon, the personalized UI can be acquired conveniently and rapidly, so that the using habit of the user is met, the user operation is simplified and user experience is improved.

DETAILED DESCRIPTION

The disclosure will be further described below with reference to the drawings and embodiments in detail.

Figure 1:
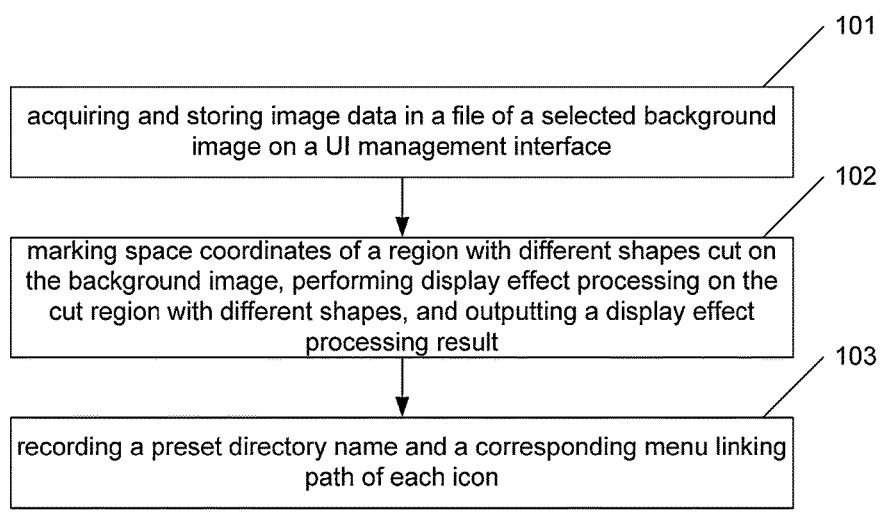
FIG. 1 shows a flowchart of a method for setting a UI of the disclosure.

A method for setting a UI of the discourse, as shown in FIG. 1, includes the following steps:

Step 101: acquiring and storing image data in a file of a selected background image on a UI management interface;

here, a user can select a background image randomly according to the own hobbies; the selected background image may be a static or dynamic image; the selected background image may be a two-dimensional or three-dimensional image; the selected background image may be artistic, or natural, or personalized or the like; and the format of the file of the selected background image may be JPG, GIF, BMP, TIF, TGA, PSD, SWF, SVG or the like.

The image data includes data of a frame, an image layer, an image, a data domain and a control domain;

the step of acquiring and storing image data in a file of a selected background image specifically includes:

extracting data of a frame, an image layer, an image, a data domain or a control domain from the file of the background image, and storing the data according to a data structure, wherein the data structure may be a tree structure; and required data can be searched rapidly in subsequent operation by storing the data according to the data structure.

Before acquiring and storing image data in a file of a selected background image, the method can also include:

storing the file of the selected background image; and during a practical application process, when the data is stored, the file of the selected background image is converted into a preset format, such as GIF, according to the format of the file of the selected background image and a corresponding compression method, or the file of the selected background image can be stored directly according to its own format.

The structure of a GIF file can be divided into a file header, a GIF data stream and a file trailer, wherein the file header includes a GIF file signature and a version number; the GIF data stream consists of a control identifier, an image block and other expansion blocks; and the file trailer only has a character with the value of 0x3B, namely ";", and represents the end of the file;

the GIF includes: <GIF data stream>::=head <logic view screen> <data>*trailer record. The rule defines the entity of the <GIF data stream> as that: from the head, a logic view screen entity follows the head, a data entity follows the logic view screen entity and a terminator follows the data entity; the * after the data entity expresses that the data entity can appear 0 or more times at the position, wherein the <logic view screen>::=logic view screen description block [global colour table];
<data>::=<imaging block >|<special purpose block>;
<imaging block>::=[image control expansion]<imaging block>;
<imaging block>::=<table-based image>|plain text expansion;
<table-based image>::=image descriptor [local colour table] image data;
<special purpose block>::=application expansion |annotation expansion;

taking the GIF as an example, the step is specifically realized by the following steps:

stripping an imaging block of a data entity in a GIF file from the GIF file according to a meaning of a control block character; and respectively storing data of a stripped static image and a corresponding control character;

when the selected background image is a static image, the static image is the overall image of the background image, and at the time, only one static image exists; when the selected background image is a dynamic image, the dynamic image consists of a plurality of static images, and at the time, the stripped data of the static image and the corresponding control characters include data of all static images and the corresponding control characters;

the control block character includes information for controlling and processing a data stream or setting hardware parameters, and includes the head, the logic view screen description block, the image control expansion, the trailer record and the like; and in practical application, in order to search the required data and the corresponding control character rapidly in the process of setting the UI, the stripped data of the overall image and the corresponding control character can be stored respectively; and when the format of the background image is JPG, the processing process of the format of the background image is completely the same as the processing process of the GIF format.

Step 102: marking space coordinates of a region with different shapes cut on the background image, performing display effect processing on the cut region with different shapes, and outputting a display effect processing result; and here, the user can slide on the screen of the used Tablet PC through a finger or a mouse to generate different shapes, wherein the shapes may be an ellipse, a circular shape, a rectangle or the like; when the user slides, a region with favourite images can be selected from the background image first and then a shape is generated in the selected image region by sliding through the finger or the mouse after the image area is selected; and therefore, a favourite image of the user can be cut from the background image.

The step of performing display effect processing on the cut region with different shapes specifically includes:

inserting a line shape of a highlighted border of the cut region with different shapes into the file of the selected background image according to the stored image data in the file of the selected background image and the space coordinates of the cut region with different shapes; and/or, acquiring image data of the cut region with different shapes from the stored image data according to space coordinates of a starting point and an end point of each shape; and performing artistic processing on the acquired image data of the region with different shapes and inserting the processed data into the file of the selected background image.

The width of the line shape of the highlighted border is generally set as 2 to 4 frames according to the resolution of the touch screen of the Tablet PC used by the user; and during inserting, according to the control domain, the line shape of the highlighted border of the cut different shapes is inserted into the data domain of the file of the selected background image, and the character of the corresponding control domain is modified.

After performing artistic processing on the acquired image data of the different shapes, the image of the region with different shapes can be presented to the user in a convex or a concave mode; and the specific processing process of performing artistic processing is completely the same as the conventional artistic processing process.

The specific implementation mode of inserting the processed data into the file of the selected background image can be that the processed data and the selected background image serve as an image layer; at the time, according to the control domain, the processed data is inserted into the data domain of the file of the selected background image, and then the character of the corresponding control domain is modified; and the specific implementation mode of inserting the processed data into the file of the selected background image can also be that the processed data and the selected background image are respectively independent image layers, namely the processed data and the selected background image are two image layers; at the time, according to the control domain, the processed data is inserted into the data domain of the file of the selected background image, and then the corresponding character of the control domain and the corresponding character of the image layer are modified; and specifically, one is added to the number of the image layer.

The step of outputting the display effect processing result includes: outputting a new file which is formed after inserting the processed data into the file of the selected background image, wherein during the practical application process, the output display effect processing result can be stored to an assigned position.

After the user slides various shapes according to the own requirements, the image data of the cut different shapes can be obtained from the stored image data by utilizing an algorithm through the Tablet PC used by the user according to the space coordinates of the starting point and the end point of each shape; and the specific processing process is completely the same as the image processing process in the prior art.

Taking the GIF as an example, the step is specifically realized by:

marking the space coordinates of the cut region with different shapes on the background image, and inserting the line shape of the highlighted border of the cut region with different shapes into the GIF file of the selected background image according to the stored data of the static image, the corresponding control character and the space coordinates of the cut region with different shapes; and/or, acquiring the data of the cut region with different shapes and the corresponding control character from the stored data of the static image and the corresponding control character according to the space coordinates of the starting point and the end point of each shape; and performing the artistic processing on the acquired data of the region with different shapes and the corresponding control character, and inserting the processed data into the GIF file of the selected background image.

Step 103: recording a preset directory name and a corresponding menu linking path of each icon.

Each shape generated by sliding the finger or the mouse by the user is called an icon; when the directory name is set, the directory name can be set according to the hobby of the user and the application randomly; and the process of setting the corresponding menu linking path is completely the same as the mode of the linking a path in the conventional UI design process.

After the step is completed, the process of setting the UI is completed; after exiting the UI management interface, the set UI can be seen by the user in a Home Screen; when required, the user can set the UI which has been set as the desktop; and the following operation is the same as a normal window management process of Windows or Android.

The disclosure will be further described below with reference to embodiments in detail.

In the embodiment, the user selects a dynamic image as the background image, namely the format of the background image is GIF.

Figure 2:
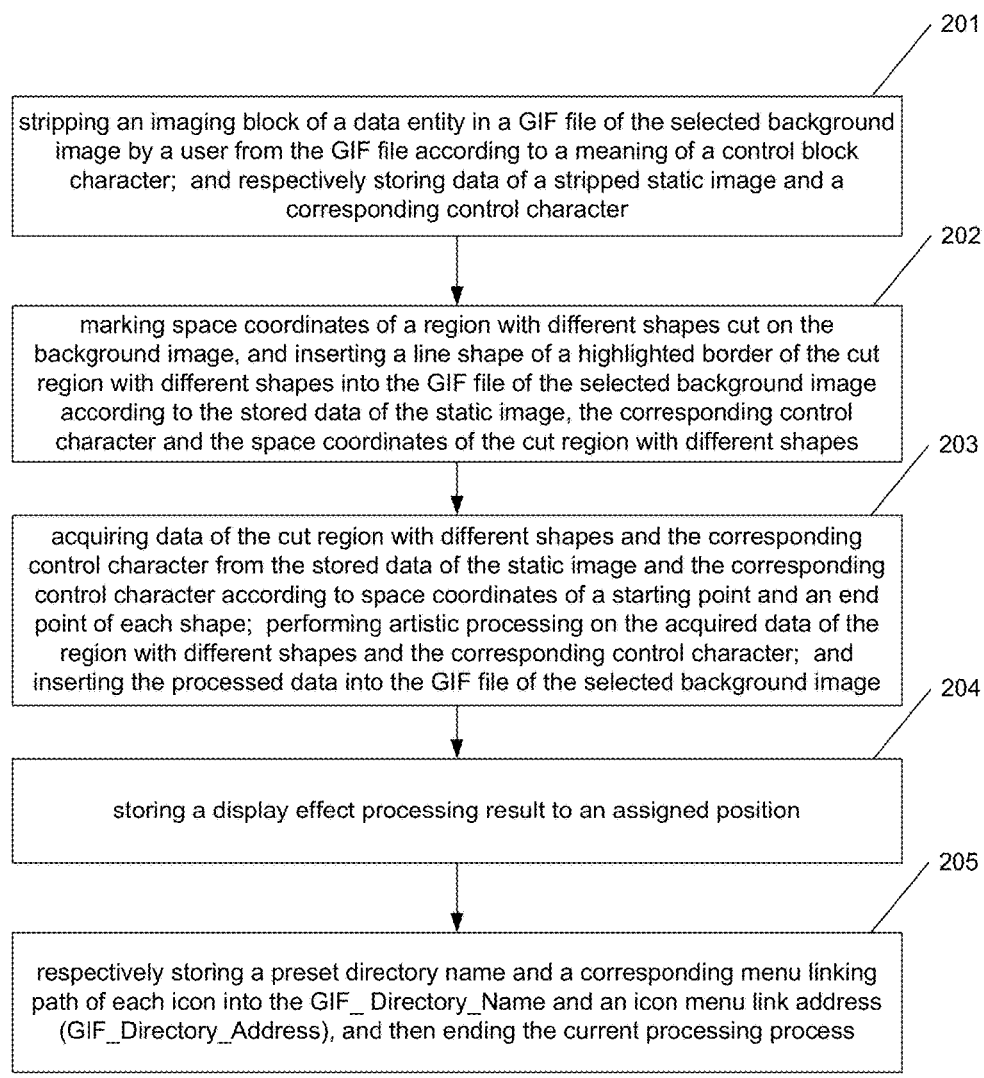
FIG. 2 shows a flowchart of a method for setting a UI of an embodiment of the disclosure.

A method for setting a UI provided by an embodiment, as shown in FIG. 2, includes the following steps:

Step 201: stripping an imaging block of a data entity in a GIF file of the selected background image by a user from the GIF file according to a meaning of a control block character; and respectively storing data of a stripped static image and a corresponding control character.

Step 202: marking space coordinates of a region with different shapes cut on the background image, and inserting a line shape of a highlighted border of the cut region with different shapes into the GIF file of the selected background image according to the stored data of the static image, the corresponding control character and the space coordinates of the cut region with different shapes.

Step 203: acquiring data of the cut region with different shapes and the corresponding control character from the stored data of the static image and the corresponding control character according to space coordinates of a starting point and an end point of each shape; performing artistic processing on the acquired data of the region with different shapes and the corresponding control character; and inserting the processed data into the GIF file of the selected background image.

Step 204: storing a display effect processing result to an assigned position.

Step 205: respectively storing a preset directory name and a corresponding menu linking path of each icon into the GIF__ Directory_Name and an icon menu link address (GIF_Directory_Address), and then ending the current processing process.

Here, the directory name set in the embodiment includes communication, favourites, application, operator, management and amusement respectively.

Figure 3:
FIG. 3 shows a desktop diagram of an embodiment of the disclosure.
Figure 4:
FIG. 4 shows a conventional desktop diagram.

After the set UI is set as the desktop, the desktop diagram as shown in FIG. 3 is obtained; the FIG. 4 is a conventional desktop diagram; and the two diagrams show that the desktop diagram as shown in FIG. 3 is more attractive and personalized compared with the desktop diagram as shown in FIG. 4, so that the user is more satisfied.

Figure 5:
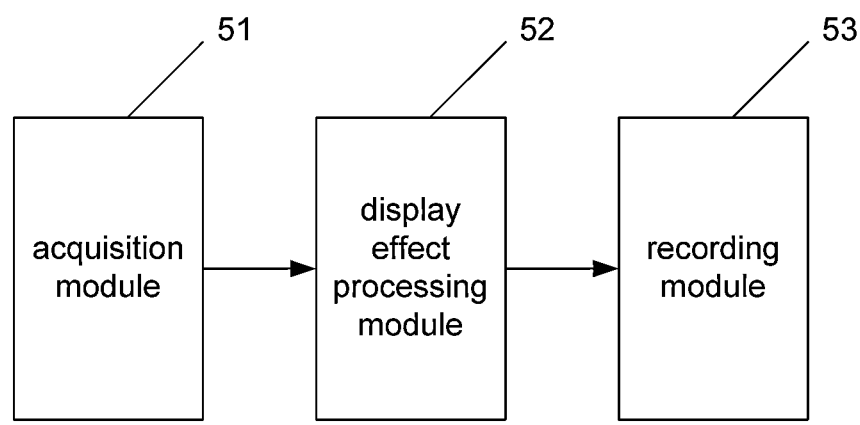
FIG. 5 shows a structure diagram of a device for setting a UI of the disclosure.

In order to implement the method, the disclosure also provides a device for setting a UI. As shown in FIG. 5, the device includes an acquisition module 51, a display effect processing module 52 and a recording module 53, wherein the acquisition module 51 is configured to acquire and store image data in a file of a selected background image on a UI management interface, and trigger the display effect processing module 52 after storing the image data;

the display effect processing module 52 is configured to mark space coordinates of a region with different shapes cut on the background image after receiving triggering information from the acquisition module 51, to perform display effect processing on the cut region with different shapes, to output a display effect processing result, and to trigger the recording module 53 after outputting the processing result; and the recording module 53 is configured to record a preset directory name and a corresponding menu linking path of each icon after receiving triggering information from the display effect processing module 52.

The device can further include a storage module configured to store the file of the selected background image.

The storage module can also be configured to store the output display effect processing result.

The acquisition module 51 is specifically configured to extract data of a frame, an image layer, an image, a data domain and a control domain from the file of the selected background image and store the data according to a data structure.

Here, the specific processing process of the display effect processing module of the device of the disclosure has been described in detail in the above and is not repeated here.

The above is only a preferred embodiment of the disclosure and not intended to limit the scope of protection of the disclosure; and any modifications, equivalent replacements, improvements and the like within the spirit and principle of the disclosure shall fall within the scope of protection of the disclosure.

What is claimed is:

1. A method for setting a User Interface (UI), comprising:
    acquiring and storing image data in a file of a selected background image on a UI management interface; wherein the image data comprises: data of a frame, an image layer, an image, a data domain and a control domain; the data of the data domain comprises an imaging block of a data entity in the file of the selected background image, and the data of the control domain comprises a control block character including a head, a logic view screen description block, an image control expansion and a trailer record;
    wherein the acquiring and storing image data in a file of a selected background image on a UI management interface comprises: extracting data of a frame, an image layer, an image, a data domain and a control domain from the file of the background image, and storing the extracted image data according to a data structure;
    selecting a region with different shapes on the background image, marking space coordinates of the selected region with different shapes, performing display effect processing on the region with different shapes according to the space coordinates and the stored image data, and outputting a display effect processing result as a new file of a background image and storing the output display effect processing result to an assigned position as a new file of a background image; and
    setting the new file of the background image as a new UI;
    wherein the performing display effect processing on the region with different shapes according to the space coordinates and the stored image data comprises inserting processed data into the file of the selected background,
    wherein the processed data comprises at least one of:
    inserting a line shape of a highlighted border of the region with different shapes into the file of the selected background image according to the stored image data and the space coordinates; or,
    acquiring image data of the region with different shapes from the stored image data according to space coordinates of a starting point and an end point of each shape; and performing artistic processing on the acquired image data of the region with different shapes;
    wherein the inserting processed data comprises: according to the control domain of the file of the selected background image, inserting the line shape of the highlighted border of the region with different shapes into the data domain of the file of the selected background image, and modifying the character of the control domain;
    wherein the inserting the processed data into the file of the selected background image further comprises: when the processed data and the selected background image are image layers, according to the control domain of the file of the selected background image, inserting the processed data into the data domain of the file of the selected background image, and modifying the character of the control domain;
    when the processed data and the selected background image are respectively independent image layers, according to the control domain of the file of the selected background image, inserting the processed data into the data domain of the file of the selected background image, and modifying the character of the control domain and the character of the image layer.

2. The method according to claim 1, wherein when the file of the selected background image is in a Graphics Interchange Format (GIF), the acquiring and storing image data in a file of a selected background image comprises:
    stripping an imaging block of a data entity in a GIF file from the GIF file according to a meaning of a control block character; and respectively storing data of a stripped static image and a corresponding control character.

3. The method according to claim 2, wherein the performing display effect processing on the region with different shapes according to the space coordinates and the stored image data comprises at least one of:
    inserting a line shape of a highlighted border of the region with different shapes into the GIF file of the selected background image according to the stored data of the static image, the corresponding control character and the space coordinates; or,
    acquiring data of the region with different shapes and the corresponding control character from the stored data of the static image and the corresponding control character according to space coordinates of a starting point and an end point of each shape; and performing artistic processing on the acquired data of the region with different shapes and the corresponding control character, and inserting the processed data into the GIF file of the selected background image.

4. The method according to claim 1, further comprising: after outputting a display effect processing result as a new file of a background image, recording a preset directory name of the new file of a background image and a corresponding menu linking path of icons.

5. The method according to claim 1, wherein the selected background image is a static or dynamic image; and the selected background image is a two-dimensional or three-dimensional image.

6. The method according to claim 1, further comprising: before acquiring and storing image data in a file of a selected background image on a UI management interface, storing the file of the selected background image in a preset format or according to its own format.

7. A device for setting a User Interface (UI), the device is applied in electronic equipment with screens, wherein the device comprises at least one processor, wherein
the at least one processor is configured to:
acquire and store image data in a file of a selected background image on a UI management interface; the image data comprises: data of a frame, an image layer, an image, a data domain and a control domain; the data of the data domain comprises an imaging block of a data entity in the file of the selected background image, and the data of the control domain comprises a control block character including a head, a logic view screen description block, an image control expansion and a trailer record;
select a region with different shapes on the background image and mark space coordinates of the selected region with different shapes, to perform display effect processing on the region with different shapes according to the space coordinates and the stored image data, and to output a display effect processing result as a new file of a background image and store the output display effect processing result to an assigned position as a new file of a background image; and
set the new file of the background image as a new UI;
wherein the at least one processor is further configured to:
extract data of a frame, an image layer, an image, a data domain and a control domain from the file of the background image and store the extracted data according to a data structure;
wherein the at least one processor is further configured to insert processed data into the file of the selected background,
wherein the processed data comprises at least one of:
inserting a line shape of a highlighted border of the region with different shapes into the file of the selected background image according to the stored image data and the space coordinates; or,
acquiring image data of the region with different shapes from the stored image data according to space coordinates of a starting point and an end point of each shape; and to perform artistic processing on the acquired image data of the region with different shapes;
the at least one processor is further configured to insert, according to the control domain of the file of the selected background image, the line shape of the highlighted border of the region with different shapes into the data domain of the file of the selected background image, and modify the character of the control domain; and the at least one processor is further configured to insert, according to the control domain of the file of the selected background image, the processed data into the data domain of the file of the selected background image when the processed data and the selected background image are image layers, and modify the character of the control domain; and to insert, according to the control domain of the file of the selected background image, the processed data into the data domain of the file of the selected background image when the processed data and the selected background image are respectively independent image layers, and modify the character of the control domain and the character of the image layer.

8. The device according to claim 7, wherein when the file of the selected background image is in a Graphics Interchange Format (GIF), the at least one processor is further configured to strip an imaging block of a data entity in a GIF file from the GIF file according to a meaning of a control block character; and respectively store data of a stripped static image and a corresponding control character.

9. The device according to claim 8, wherein the at least one processor is further configured to at least one of:
inserting a line shape of a highlighted border of the region with different shapes into the GIF file of the selected background image according to the stored data of the static image, the corresponding control character and the space coordinates; or,
acquiring data of the region with different shapes and the corresponding control character from the stored data of the static image and the corresponding control character according to space coordinates of a starting point and an end point of each shape; and to perform artistic processing on the acquired data of the region with different shapes and the corresponding control character, and insert the processed data into the GIF file of the selected background image.

10. The device according to claim 7, the at least one processor is further configured to record a preset directory name and a corresponding menu linking path of icons.

11. The device according to claim 7, wherein the selected background image is a static or dynamic image; and the selected background image is a two-dimensional or three-dimensional image.

12. The device according to claim 7, the at least one processor is further configured to store the file of the selected background image in a preset format or according to its own format.

* * * * *